Nov. 6, 1934.   E. G. PETERSEN   1,979,810
RADIATOR SHUTTER
Filed May 23, 1931   2 Sheets-Sheet 1
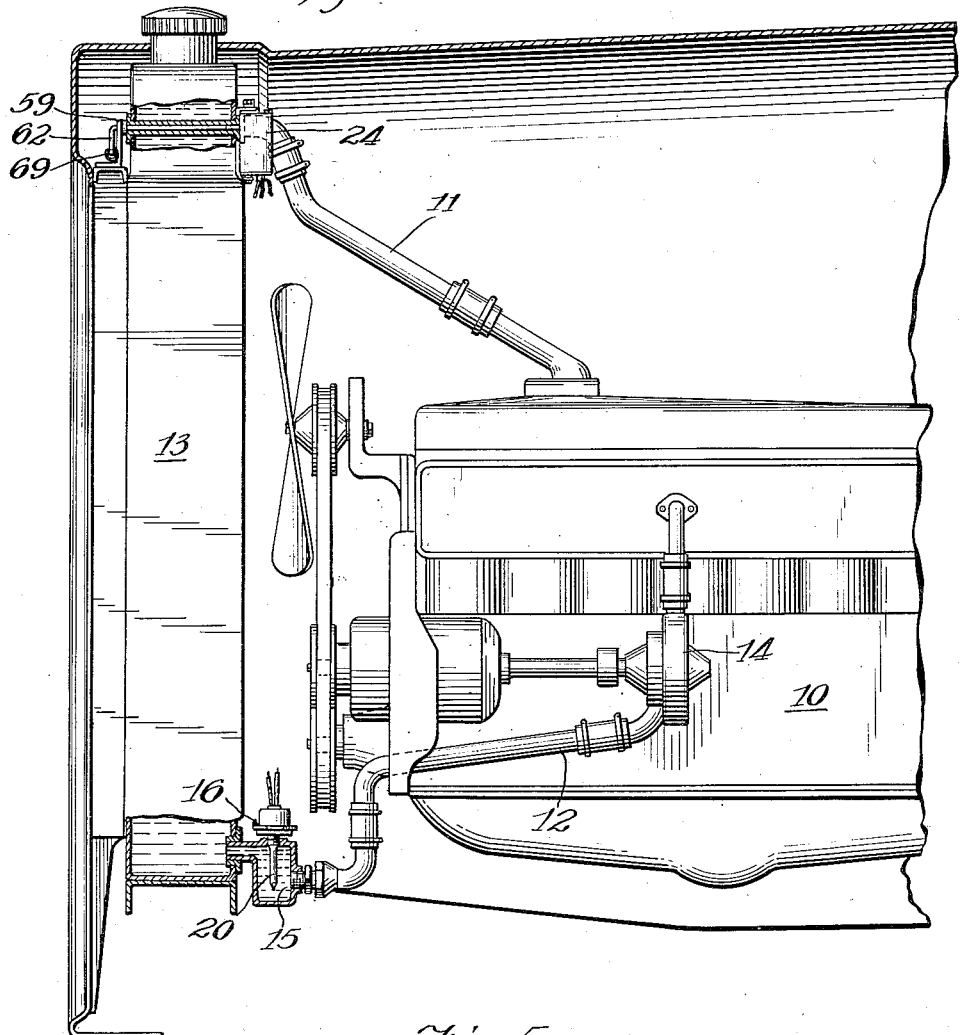
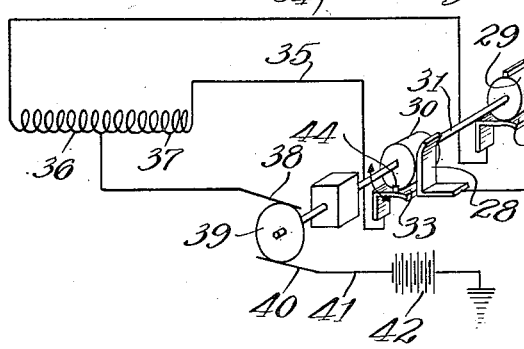
Inventor:
Edgar G. Petersen
By Williams, Bradbury,
McCaleb & Hinkle. Attys.

Nov. 6, 1934.  E. G. PETERSEN  1,979,810
RADIATOR SHUTTER
Filed May 23, 1931  2 Sheets-Sheet 2
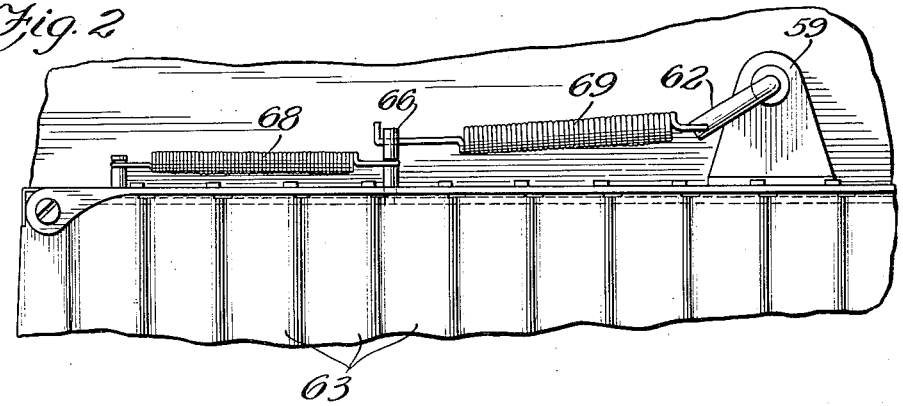
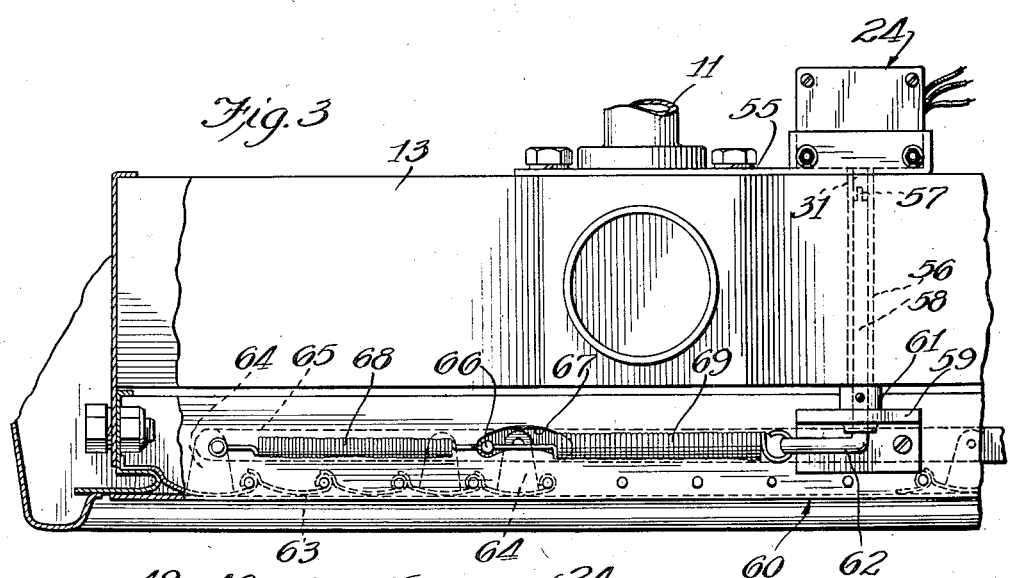
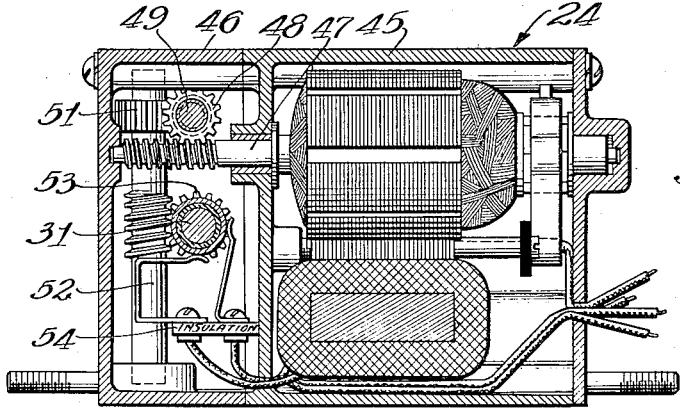
Inventor:
Edgar G. Petersen
By Williams, Bradbury, McCaleb
& Hinkle  Attys.

Patented Nov. 6, 1934

1,979,810

UNITED STATES PATENT OFFICE 1,979,810

RADIATOR SHUTTER

Edgar G. Petersen, Chicago, Ill., assignor to Pines Winterfront Company, Chicago, Ill., a corporation of Delaware Application May 23, 1931, Serial No. 539,556

7 Claims. (Cl. 236—35)

This invention relates to radiator shutters for automotive vehicles, and particularly to means for effecting the opening and closing thereof.

One of the objects of the invention is to provide an improved automotive mechanism for opening and closing the shutter.

A further object of the invention is to provide an improved motor operated shutter of the general type described and claimed in my copending application Serial No. 517,907, filed February 24, 1931.

Other objects, advantages and capabilities of the invention will hereinafter appear from the following description of a preferred embodiment thereof taken in conjunction with the accompanying drawings, in which Figure 1 is an elevational view, partly in section showing an automobile engine embodying my invention;

Figure 2 is a fragmentary front view of the shutter and associated parts, the radiator shell being removed;

Figure 3 is a fragmentary plan view of the mechanism shown in Fig. 2;

Figure 4 is a sectional view through the motor and gear box; and

Figure 5 is a wiring diagram.

Referring to the drawings the numeral 10 designates an automobile engine, connected by upper conduit 11 and lower conduit 12 to a radiator 13. A pump 14 causes the cooling fluid to circulate through the system and a chamber 15 is suitably provided at the lowest point of the lower conduit 12 in the manner described in the application referred to above.

A thermostatic switch 16, which may be of the general type described in said application, is mounted in the chamber 15. This switch is shown diagrammatically in Fig. 5 and comprises a thermostatic metallic strip 17 which is adapted to make contact with the contact points 18 and 19 at the maximum and minimum temperatures respectively. The strip 17 is rigidly mounted at the lower end of the tube 20 which extends into the chamber 15. Electro-magnets 21 and 22 having windings in series with the contacts 18 and 19 are provided on each side of the strip to attract a shoe 23 carried by same so as to make firm contact while the motor 24 is operating.

The windings 21 and 22 are connected by leads 25 and 26 to contacts 27 and 28 respectively which resiliently bear upon conducting sleeves 29 and 30 which are mounted upon shaft 31 and are insulated therefrom. Contacts 32 and 33 also bear against the sleeves 29 and 30 and these contacts are connected by leads 34 and 35 to opposite field windings 36 and 37 respectively of the motor 24. The other ends of the windings 36 and 37 are connected to one of the brushes 38 of the commutator 39. The other brush 40 is connected by the lead 41 to the battery 42 one pole of which is grounded in the usual manner.

The sleeves 29 and 30 are provided with nonconducting projections 43 and 44 which are adapted to engage the contacts 27 and 33 respectively and terminate the operation of the motor for the time being.

The motor 24 is enclosed in a housing 45, which has secured thereto a housing 46 which encloses a reduction gearing of suitable ratios. The shaft 47 of the motor 24 extends into the housing 46 and is therein provided with a worm which cooperates with a worm gear 48 mounted on a shaft 49. The shaft 49 is supported in bearings in the housing 46 and carries a worm which cooperates with a worm gear 51 on a shaft 52 mounted in bearings provided in the housing 46. The shaft 52 carries a worm which cooperates with a worm gear 53 on the shaft 31 which is also mounted in the housing 46, the contacts 27, 28, 32 and 33 being mounted on a strip of insulation 54 rigidly mounted therein.

The combined housing 45, 46 is mounted on the rear side of the upper water box of the radiator by means of a bracket 55. One end of the shaft 31 projects out of the housing in the forward direction and extends into a tube 56 which extends through said water box. The forward end of the shaft 31 is slotted to receive a tongue 57 provided on the rear end of a rod 58 which is located in said tube. The forward end of the rod 57 is supported on a bracket 59 carried by the frame of the radiator shutter 60. A collar 61 secured upon the rod 58 on the rear side of the bracket 59 limits the forward movement of said rod. At its forward end the rod 58 carries a depending crank arm 62.

The radiator shutter 60 comprises a frame in which are pivotally mounted a series of vertical shutter elements 63. At its upper end each element 63 carries a rearwardly extending arm 64, said arms being pivotally connected to an actuating bar 65, whereby the shutter elements may be operated in unison. The bar 65 carries a pin 66 which projects upwardly through a slot 67 in the top frame member. A relatively light spring 68 connected to the pin 66 and to the frame normally tends to move the shutter elements to their closed position. The pin 66 is connected to the crank arm 62 by a stout spring 69 whereby the motor 24 may open the shutter elements against action of the spring 68.

The operation of the device is as follows. When the maximum temperature of the fluid cooling medium is reached the strip 17 flexes until it touches the contact point 18, closing the circuit through battery 42, armature, field winding 36, contact 32, sleeve 29, contact 27 and electro-magnet 21. This electro-magnet is energized and contact is made firm while the motor operates to rotate the crank arm 62 through 90°. This rotation of the crank arm operates through the stout spring 69 to open the shutter elements, the spring 68 being readily expanded. Should the shutter be jammed in any way the stout spring 69 will expand and the motor 24 will not burn out. When the shutter elements attain their open position, the insulating projection 43 raises the contact 27 from the sleeve 29 and the circuit is broken.

When the minimum temperature is attained by the cooling fluid, a circuit is completed through battery 42, armature, field winding 37, contacts 33 and 28, magnet 22, contact 19 and strip 17. This causes the motor 24 to operate in the opposite direction until the insulating projection 44 engages the contact 33 and breaks the circuit. The return movement of the crank arm 62 which is thereby effected, permits the spring 68 to close the shutter elements. It will be noted that if the shutter is jammed open, for example by a stone, no damage is done to the motor or other parts of the device, since the closing of the shutter elements is effected exclusively by the resilient tension of the spring 68.

It will be understood that the electrical circuits may be modified in many respects and that different types of motors may be employed. While I have shown a two-way motor I do not intend to be limited thereto.

Having thus described my invention what I claim as new and desire to secure by Letters Patent is:

1. In an engine cooling system, in combination, a radiator, a shutter for the radiator, an electric motor, an irreversible train of gearing through which the motor is adapted to actuate the shutter in one direction, means independent of the motor for operating the shutter in the opposite direction, and a thermostatic switch subject to the temperature of the cooling liquid adapted to control the motor, said irreversible train of gearing preventing said independent means from operating the shutters except when the motor is operating in the appropriate direction.

2. In an engine cooling system, in combination, a radiator, a shutter for the radiator, a two-way electric motor, an irreversible train of gearing through which the motor is adapted to operate the shutter in one direction, and a spring opposing the operation of the shutter by the motor and adapted to operate the shutter in the opposite direction when the motor is reversed.

3. In an engine cooling system, in combination, a radiator, a shutter for the radiator, a two-way electric motor, an irreversible train of gearing through which the motor is adapted to operate the shutter in one direction, a spring opposing the operation of the shutter by the motor and adapted to operate the shutter in the opposite direction when the motor is reversed, and a thermostatic switch controlling the operation of the motor.

4. In an engine cooling system, in combination, a radiator, a shutter for the radiator, a two-way electric motor, an irreversible train of gearing, a crank adapted to be actuated by the motor through said train of gearing for a predetermined angle in both directions, resilient means connecting the crank to the shutter to operate same in one direction, and resilient means opposing said operation and adapted to operate the shutter in the opposite direction when the motor reverses the crank, and a switch controlling the direction of operation of the motor.

5. In an engine cooling system, in combination, a radiator, a shutter for the radiator, an electric motor, an irreversible train of gearing through which the motor is adapted to actuate the shutter in one direction, means independent of the motor for operating the shutter in the opposite direction, a thermostatic switch subject to the temperature of the cooling liquid adapted to control the motor, and a limit switch adapted to stop the motor after a predetermined operation.

6. In an engine cooling system, in combination, a radiator, a shutter for the radiator, a two-way electric motor, an irreversible train of gearing adapted to operate the shutter in one direction, a spring opposing the operation of the shutter by the motor and adapted to operate the shutter in the opposite direction when the motor is reversed, a thermostatic switch controlling the operation of the motor, and a pair of limit switches adapted to stop the motor after a predetermined operation in each direction.

7. In an engine cooling system, in combination, a radiator, a shutter for the radiator, a two-way electric motor, an irreversible train of gearing, a crank adapted to be actuated by the motor through said train of gearing in both directions, resilient means connecting the crank to the shutter to operate same in one direction, resilient means opposing said operation and adapted to operate the shutter in the opposite direction when the motor reverses the crank, a switch controlling the direction of the motor, and limit switches adapted to stop the motor after a predetermined operation thereof.

EDGAR G. PETERSEN.